Figure 1:
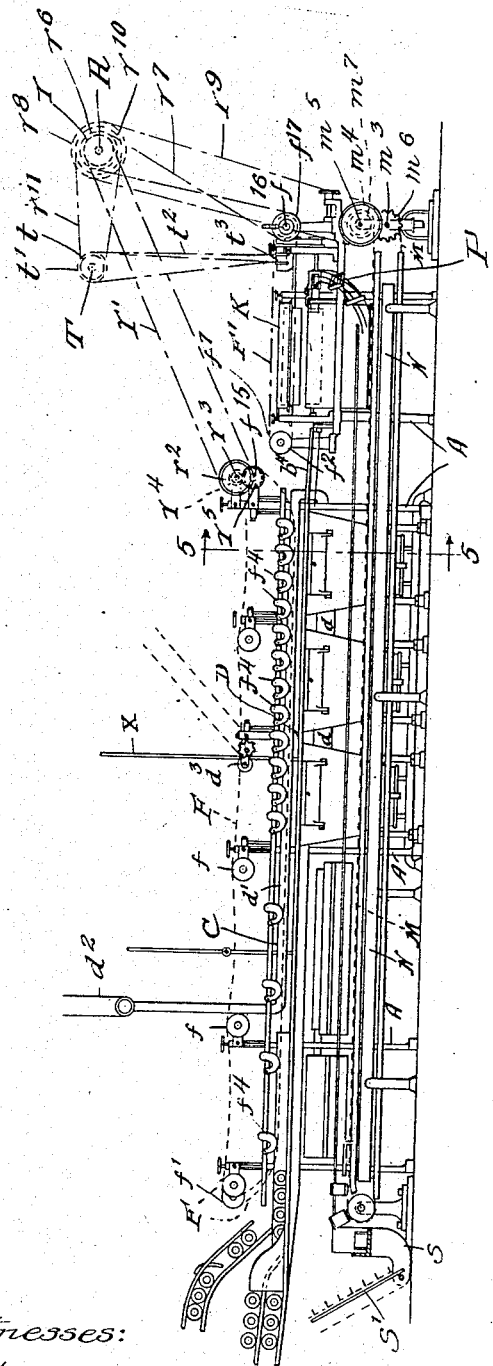

No. 797,985. PATENTED AUG. 22, 1905.
J. C. TALIAFERRO.
CAN SOLDERING MACHINE.
APPLICATION FILED JUNE 20, 1904.

6 SHEETS—SHEET 1.

Witnesses:
Wm. Geiger

Inventor:
John C. Taliaferro
By Munday, Evarts & Adcock.
Attorneys

No. 797,985. PATENTED AUG. 22, 1905.
J. C. TALIAFERRO.
CAN SOLDERING MACHINE.
APPLICATION FILED JUNE 20, 1904.

6 SHEETS—SHEET 3.

Witnesses:
Wm. Geiger
H. W. Munday

Inventor:
John C. Taliaferro
By Munday, Evarts & Adcock.
Attorneys

No. 797,985. PATENTED AUG. 22, 1905.
J. C. TALIAFERRO.
CAN SOLDERING MACHINE.
APPLICATION FILED JUNE 20, 1904.
6 SHEETS—SHEET 4.
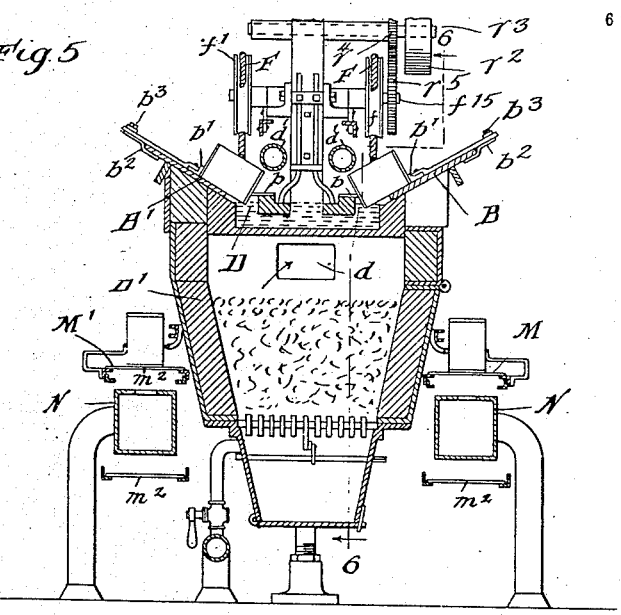
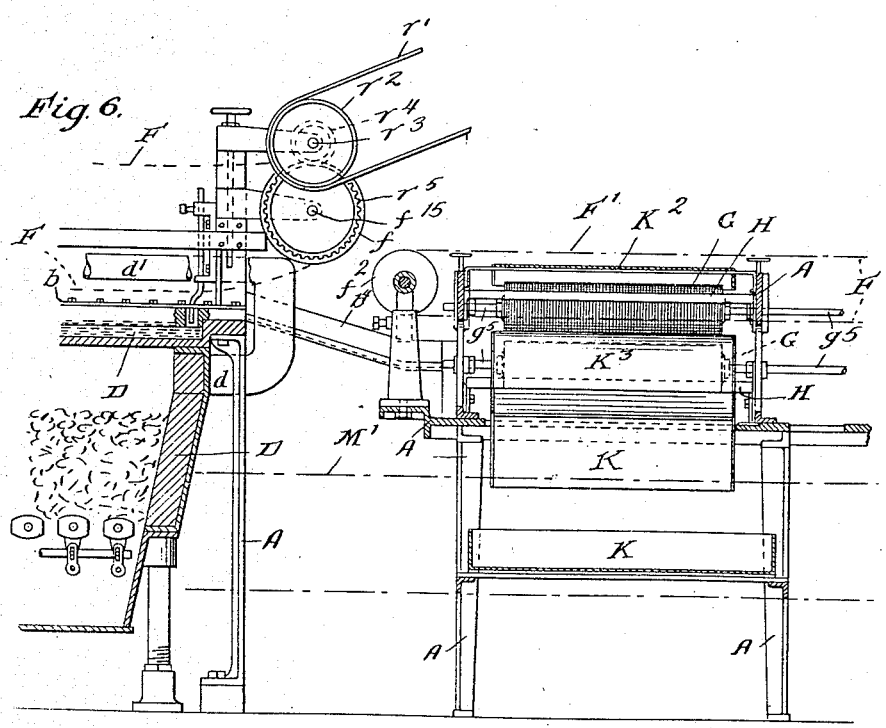
Witnesses:
Wm. Geiger
Inventor:
John C Taliaferro
By Munday, Evarts & Adcock.
Attorneys No. 797,985. PATENTED AUG. 22, 1905.
J. C. TALIAFERRO.
CAN SOLDERING MACHINE.
APPLICATION FILED JUNE 20, 1904.

6 SHEETS—SHEET 5.

Witnesses:
Wm. Geiger
H. W. Munday

Inventor:
John C. Taliaferro
By Munday, Evarts & Adcock
Attorneys

No. 797,985. PATENTED AUG. 22, 1905.
J. C. TALIAFERRO.
CAN SOLDERING MACHINE.
APPLICATION FILED JUNE 20, 1904.
6 SHEETS—SHEET 6.
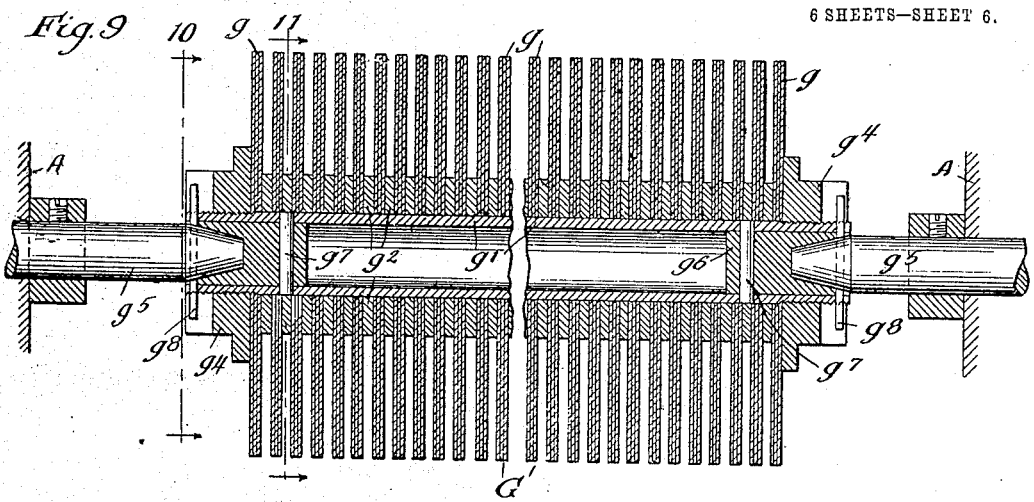
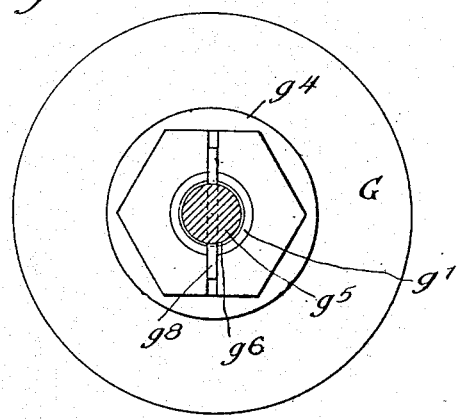
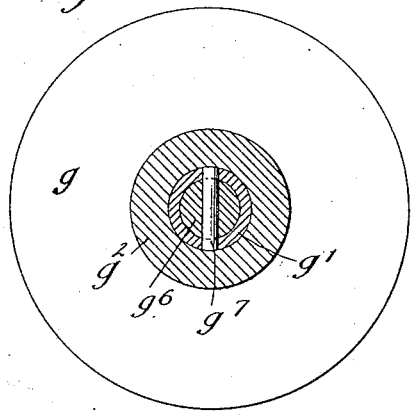
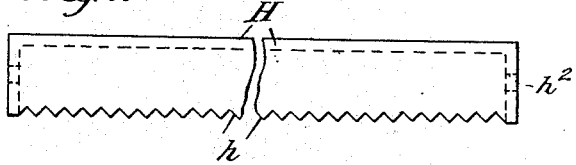
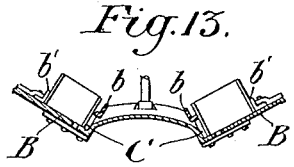
Witnesses:
Wm. Geiger
H. W. Munday
Inventor:
John C. Taliaferro
By Munday, Evarts & Adcock.
Attorneys

UNITED STATES PATENT OFFICE.

JOHN C. TALIAFERRO, OF BALTIMORE, MARYLAND, ASSIGNOR TO AMERICAN CAN COMPANY, OF JERSEY CITY, NEW JERSEY, A CORPORATION OF NEW JERSEY.

CAN-SOLDERING MACHINE.

No. 797,985.     Specification of Letters Patent.     Patented Aug. 22, 1905.

Application filed June 20, 1904. Serial No. 213,222.

*To all whom it may concern:*

Be it known that I, JOHN C. TALIAFERRO, a citizen of the United States, residing in Baltimore, in the State of Maryland, have invented a new and useful Improvement in Can-Soldering Machines, of which the following is a specification.

My invention relates to improvements in machines for soldering the end seams of sheet-metal cans.

Machines heretofore commonly in use for soldering the end seams of sheet-metal cans have ordinarily comprised a track or guideway along which the cans may be rolled in an inclined position, an endless chain or belt for rolling the cans along the track, a flux-bath or device for applying acid or other flux to the end seam of the cans as the cans are rolled along the inclined guideway or track, and a solder-bath or device for applying molten solder to the end seams of the cans as they are rolled along the inclined guideway or track, and by such machines the end seams of round cans may be very rapidly soldered and at small labor cost, but at considerable waste of solder, owing to the fact that the immersion of the circumferential corner of the can in the molten solder to the necessary depth or extent to properly solder the seam causes a thin coating of solder to adhere to the outside peripheral surface of the can-head flange, to a narrow belt of the can-body surface above the can-head flange, and to an annular portion of the flat surface of the can-head, which unnecessary outside solder coatings add nothing to the security of the joint and also detract from the neat appearance of the can. Ordinarily the combined width of this outside coating of solder on the can approximates an inch in extent. Heretofore it has been proposed to remove a portion of this superfluous outside coating of solder on the can by subjecting the freshly-soldered can to the action of stiff bristles, brushes, or wipers, exerting a wiping or brushing pressure against the cans before the solder coating becomes set, or fully set, the brushes or wipers having a slow or wiping movement; but while some of the waste or superfluous solder may thus be removed the pressure of brushes or wipers against the can—against the members of the seam—while the solder between the members of the seam and which is to unite the seam is yet molten or unset is liable to disturb the seam, to slightly move one member thereof in respect to the other, and thus cause fine pin-holes or leaks in the joints or defective soldering, resulting in leaky cans, and the pressure of a moving bristle-brush or other wiper against the hot freshly-soldered can is very difficult of proper regulation and is very liable to scratch and mar the surface of the can and sometimes even to remove the tin coating of the tin-plate itself to a greater or less extent in spots or parts, as this tin coating is necessarily heated in the soldering operation to near the melting or flowing point of tin. The scratching through or removal of the tin coating exposes the steel or iron beneath the tin-plate to speedy rusting and destruction of the can and of its contents. This method of removing surplus solder from the end seams of round cans by wipers or brushes rubbing against the can with a wiping or brushing pressure and movement has as a consequence not heretofore come into general or extensive use or favor.

Heretofore it has also been proposed to remove surplus solder from the end seams of round cans by subjecting the freshly-soldered seam and while the solder thereon is yet in a molten or unset condition to the action of blasts of air or other fluids under pressure; but while such air or other blasts may blow off or remove the surplus solder, or a portion thereof, without scratching, marring, or removing the tin coating of the tin-plate this method is attended with great danger of and liability to injury by blowing out or disturbing the perfect continuity of the molten solder between the members of the seam to be united and the production of leaks or pinholes through the seam itself and consequent defective soldering and a leaky can, and for this reason this method, so far as I am aware, has not gone into general use or favor.

It is the object of my invention to produce a can-end-soldering machine of a simple, efficient, and durable construction, by means of which the end seams of round cans may be rapidly and cheaply soldered at small labor cost by simply rolling the cans, as usual, in an inclined position over a flux bath or device and a molten-solder bath or device and by which the soldering may be done without any unnecessary waste of solder—that is to say, without leaving any useless coating of solder on the outside of the can-head flange or on the annular surface of the can-head or on the can-body above the can-head flange, and without subjecting the can to any jarring action or to any pressure tending to disturb the members of the seam or the solder in and forming the joint to any action liable to break or crack, or separate the solder in the joint before the solder becomes set or while it is yet in a fluid, semifluid, or brittle state, and without in any way detracting from the strength, perfection, and continuity of the soldered joint or scratching, marring, or injuring the outside surface of the can or of the tin coating of the tin-plate.

My invention consists in the means I employ to practically accomplish this important object or result—that is to say, it consists in connection with a runway or track, along which the cans may be rolled in an inclined position, a flux bath or device, a molten-solder bath or device, an endless chain, belt, or device for rolling the cans along the runway, a cooling belt or conveyer for holding and conveying the freshly-soldered cans in an upright position or with their circumferential freshly-soldered end seams horizontal while the solder is cooling or setting, and a pair of rapidly-revolving longitudinally-arranged buffers interposed in the path of the rolling cans between the solder-bath and the cooling-belt, one engaging the flat or disk surface of the can-head and the other the circumferential surface of the can-head flange and can-body and each composed of a multitude of light thin soft flexible textile circular disks, preferably cotton-cloth disks, and each preferably about five or six inches in diameter, clamped together on a shaft or mandrel with interposed core-disks, spacer disks, or washers of small diameter. As the series of cotton-cloth disks forming the buffer are soft and flexible, the buffer can exert no disturbing pressure against the can or the members of he seam to be united, nor any brushing, scratching, or wiping action against the hot or heat-softened tin coating of the tin-plate, tending to scratch, mar, or injure the same, while at the same time, owing to the swift rapid movement of the buffer, its light soft contact or touch against the can and the molten-solder coating thereon causes the outside coating of molten solder to be entirely removed from the outside surface of the can-head, can-head flange, and can-body, which were immersed in the molten solder of the solder-bath, and as the longitudinally-arranged rapidly-rotating cylindric buffer, which engages the circumferential surface of the can-head flange and of the can-body above the can-head flange, rotates so that its peripheral moving surface travels toward the edge of the can-head flange the buffing action tends to drive the molten solder more effectually into the seam and to completely fill the joint with molten solder to the extreme edge of the can-head flange, thus filling up with solder any pin-holes or crevices that might have been left after the can was rolled through the solder-bath and have otherwise occasioned leaky or defective cans. The coöperative action of my rapidly-revolving longitudinally-arranged soft flexible composite textile-disk buffers against the molten-solder-coated outside surface of the can-head and can-body is not only to remove the waste or surplus solder coating therefrom, but to buff or polish the annular corner belt or surface of the can which has been immersed in the molten solder and to leave the same in a bright, neater, cleaner, and more polished condition than even the other surface of the can, which has not been at all touched or tarnished with solder. The cans soldered on my improved machine have a pure tin luster and brightness throughout their whole surface.

My invention produces not only a better and more perfect seam and at a great saving of solder, but also a much neater, brighter, cleaner, and better looking can than has heretofore been produced by end-seam-soldering machines operating on the principle of rolling the cans in an inclined position through or over a bath of molten solder.

My invention thus effectually removes the waste or surplus solder from the outside surface of the can and also cleans and polishes such surface by reason of the rapidly-moving light soft kissing action or buffing action of the thin light soft circular cotton disk against the can, while the solder on its outside surface and in the joint is yet in a fluid, semifluid, soft, or easily-removed condition and without subjecting the can, prior to the time the solder in the joint becomes set, to any jarring action tending to crack or separate the continuity of the solder in the joint and without subjecting the can or the members of the seam to be united by the solder in the joint to any disturbing action or pressure tending to separate or crack or otherwise disturb the perfect continuity of the solder in the joint while the solder in the joint is still fluid, semifluid, soft, or in the extremely fragile and brittle state through which the solder passes just before becoming fully set and solid and at which time the solder in the joint, as is well known, is very liable to crack or separate if the can is subjected at such time to any disturbing jarring trembling movement or pressure. My invention also consists in the novel construction of parts and devices and in the novel combinations of parts and devices herein shown or described.

Figure 2:
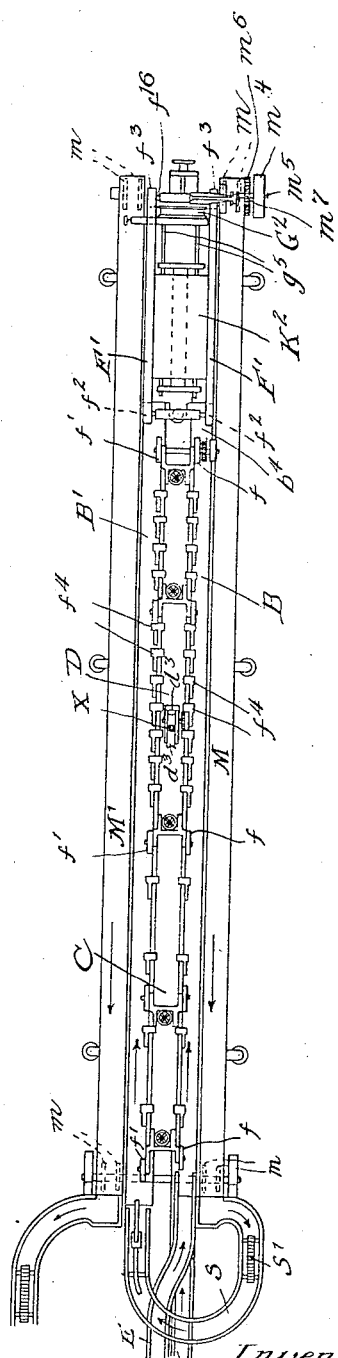
Figure 3:
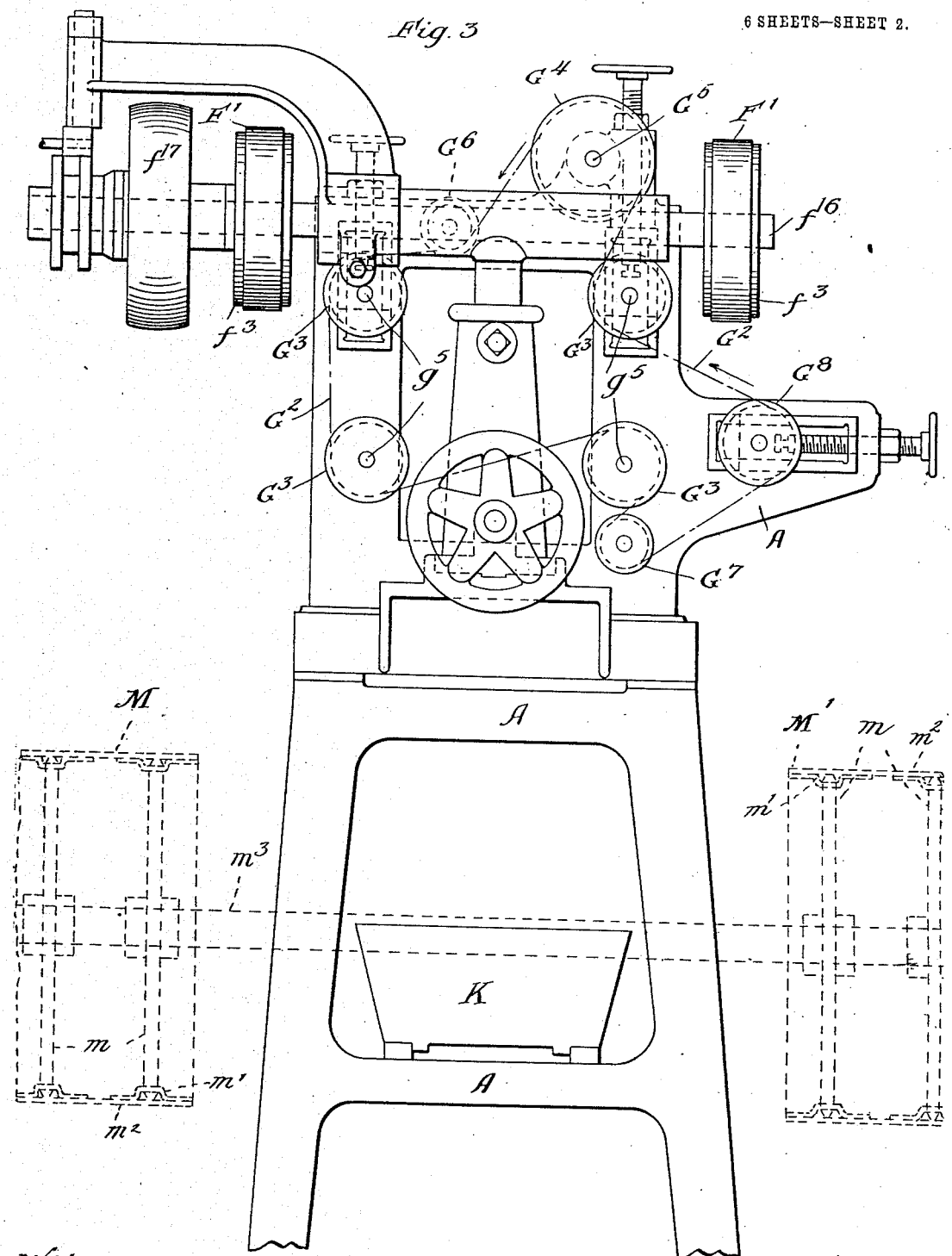
Figure 4:
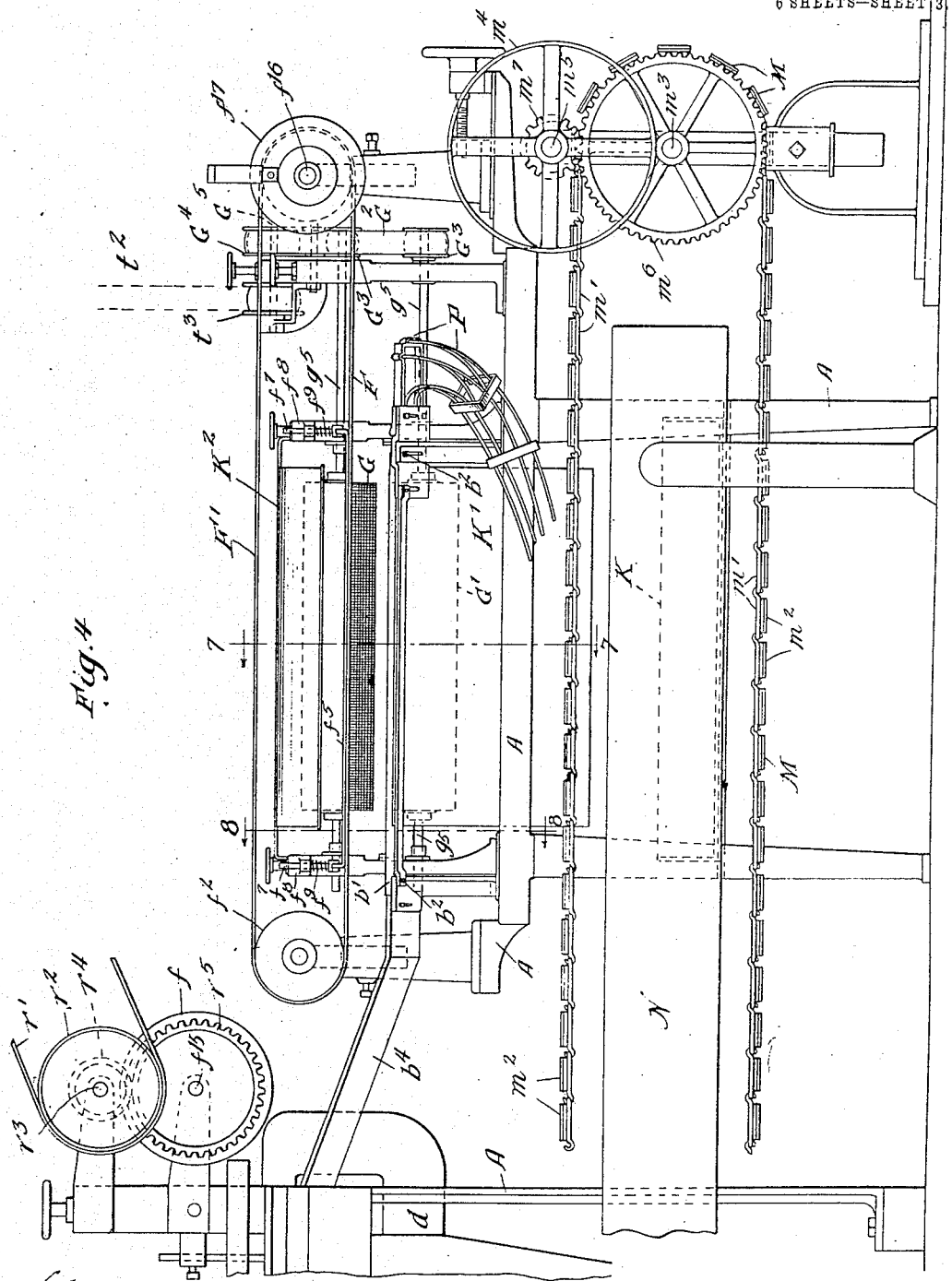
Figure 7:
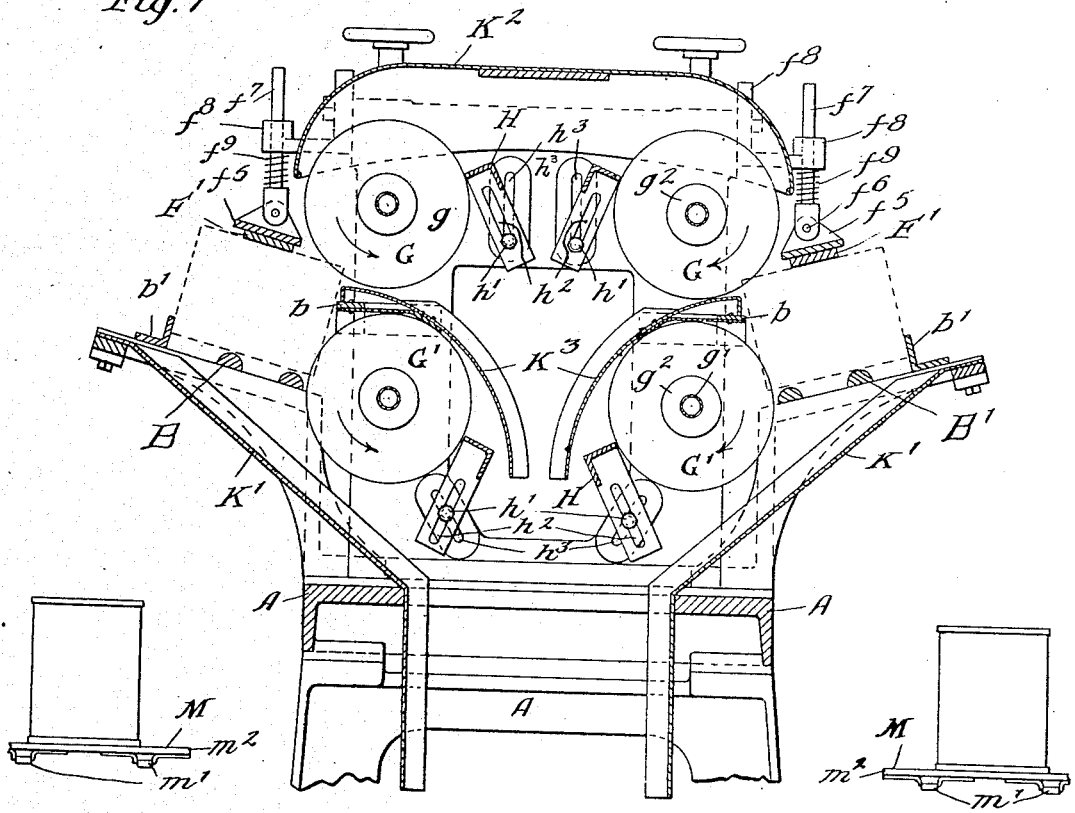
Figure 8:
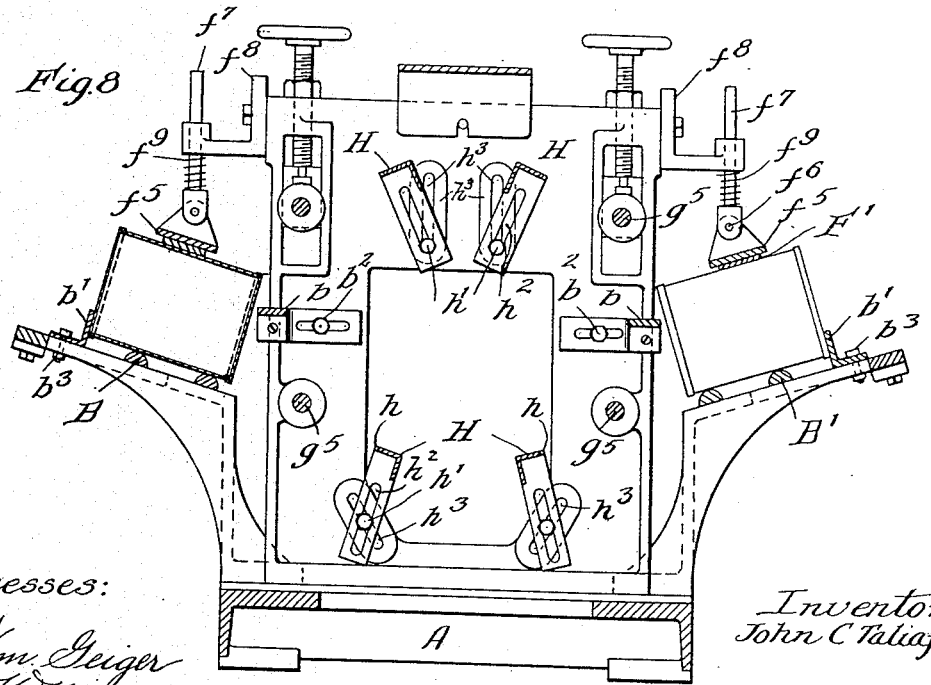

In the accompanying drawings, which form a part of this specification, Figure 1 is a side elevation of a can-end-seam-soldering machine embodying my invention. Fig. 2 is a plan view. Fig. 3 is an enlarged end view. Fig. 4 is an enlarged detail side elevation, showing the buffing mechanism. Fig. 5 is a vertical cross-section on line 5 5 of Fig. 1. Fig. 6 is a detail partial longitudinal section on line 6 6 of Fig. 5. Fig. 7 is a detail vertical section on line 7 7 of Fig. 4. Fig. 8 is a detail vertical section on line 8 8 of Fig. 4. Fig. 9 is a detail longitudinal section of one of the buffers. Figs. 10 and 11 are cross-sections on lines 10 10 and 11 11 of Fig. 9. Fig. 12 is a detail view of one of the scrapers or cleaners for the buffers, and Fig. 13 is a detail vertical cross-section through the flux-bath.

In the drawings, A represents the frame of the machine. B B' are transversely-inclined tracks or runways along which the cans may be rolled in an inclined position and extending from one end of the machine to the other, the cans rolling with one end turned downward along the track or runway B in soldering that end and the other end downward along the other track or runway B' while soldering the other end seam of the can. Each of the transversely-inclined tracks or runways B B' are furnished with a lower guide $b$ for the lower ends of the rolling cans to bear against and with an upper guide $b'$ to guide or bear against the upper ends of the cans. The upper guides $b'$ of the tracks or runways B B' are adjustably secured to the tracks or runways by clamps and adjusting-screws $b^2$ $b^3$ to adapt the machine to accommodate cans of different lengths.

C is the fluxing bath or device longitudinally arranged along the tracks or runways B B', so that the end seams of the cans will come in contact with the acid or other flux therein as the cans are rolled along the runway over the same.

D is the molten-solder bath or vessel over which the transversely-inclined tracks or runways B B' extend, so that the end seams of the cans will be immersed in or come in contact with the molten solder therein as the cans are rolled continuously along the runways or tracks B B'.

D' D' are heaters for heating and keeping molten the solder in the solder-bath. These heaters are preferably coal-burning furnaces having communicating flues $d$ and longitudinal flue $d'$, leading to upright or exhaust flue $d^2$. The solder is preferably fed or applied to the molten-solder bath or vessel in the form of a wire or rod $x$ by feed-rolls $d^3$.

E E' are can feed chutes or runways along or by which the cans to be soldered are delivered to the right-hand transversely-inclined runway B, the cans coming from one or the other runway or both runways, as may be desired.

F F and F' F' are endless conveyers for rolling the cans along the runways B B'. The endless conveyers F F for rolling the cans along that portion of the runways B B' which extend over the flux and solder baths or devices are preferably chains traveling on sprocket-wheels or pulleys $f$ $f'$, as the metal chains will not be injured by the heat of the furnaces. The endless conveyers F' F', which roll the cans along that portion of the tracks or runways B B' which extend along or adjacent to the rapidly-revolving cylindrical buffers, are preferably leather, rubber, or other belts. I prefer to employ two conveyers—one for rolling the cans along the soldering portion of the runway and the other for rolling the cans along the buffing portion of the runway—instead of using one and the same conveyer for rolling the cans from one end of the transversely-inclined runway or track B or B', as a metal or chain conveyer is better adapted to withstand the heat of the solder-bath and furnaces, while a belt conveyer gives a better frictional grip or bite against the surfaces of the cans than a metal chain, as the cans encounter somewhat more resistance while being rolled in contact with the rapidly-revolving cylindrical buffers than they do when rolling along the flux and solder baths. The use of the two separate conveyers also enables me to drive the buffing-conveyer at a somewhat higher speed, which is desirable to compensate for any additional slipping of the conveyer on the surface of the cans, due to the additional resistance offered by the buffers to the rolling of the cans. By the use of two conveyers also the stream of rolling cans may be more widely spread or separated from each other while being operated upon by the buffers, and thus prevent the particles of solder removed from one can being thrown upon a following or adjacent can. The increased speed of the second or belt conveyers F' F' also hastens the passage of the cans along the buffers and the turning and delivering of the same into an upright position on the cooling-belt before the solder in the joint sets, it being important to the production of perfect soldered seams free from leaks that the can should be maintained in an upright position while the solder in the joint is setting. The belt conveyers F' F' travel on pulleys $f'$ $f^3$.

To increase the grip of the chain conveyers F F on the rolling cans, the same is provided with a series of weights $f^4$, hinged to the frame. To increase the frictional grip of the belt conveyers F' F' on the cans, I furnish the same with a tension bar or shoe $f^5$, which rests upon the upper loop of each of the belts. To enable this weight, bar, or shoe $f^5$ to accommodate itself to the transverse inclination of the cans rolling on the transversely-inclined runway or track and to transversely incline the lower run of the belt, it is pivotally secured by pins $f^6$ to the vertically-movable guides or rods $f^7$, mounted on brackets $f^8$ on the frame. Springs $f^9$ increase the pressure of the bar or shoe $f^5$ against the belt.

Between the adjacent ends of the endless conveyers F F' the can-tracks or runways B B' are preferably furnished with a longitudinally downwardly inclined portion $b^4$ to accelerate the rolling of cans after they leave the grip of the first conveyer F and before they reach the extension-conveyer F'.

G G' G G' are two pairs of rapidly-revolving longitudinally-arranged soft flexible cylindric buffers, one, G, of each pair arranged to engage the cylindric surface of the can-head flanges and can-bodies, and the other, G', to engage the flat or disk surfaces of the can-heads as the cans are rolled along the runway. Each of the soft flexible cylindric buffers are preferably about five inches in diameter and about two feet in length and are rotated, preferably, at a speed of about six hundred revolutions per minute and are each preferably composed of a series of thin soft flexible textile circular disks $g$, preferably cotton-cloth disks, clamped together on a shaft or mandrel $g'$, with washers or spacer-rings $g^2$ interposed at intervals between the soft flexible textile buffer-disks $g$. Ordinarily a washer $g^2$ is interposed between each set of three buffer-disks $g$. The soft flexible textile buffer-disks $g$ and washers $g^2$ are clamped tight on the shaft or mandrel $g'$ by nuts $g^4$ $g^4$ on the threaded ends of the shaft $g'$. The shaft $g'$ is preferably hollow or tubular and furnished with solid shaft extensions $g^5$ $g^5$, removably secured thereto by plugs $g^6$ and pins $g^7$ $g^8$ to facilitate the quick removal and replacement of the composite-disk cylindric buffer when necessary from time to time to remove and replace the cloth buffer-disk $g$ or clean the same.

H H are scrapers, brushes, or cleaners for removing particles of solder from the buffers. Each of the scrapers H have, preferably, a notched or serrated edge $h$ to engage the composite circular cloth disk-buffers G G'. Each of the scrapers is adjustably secured to the frame by a screw or bolt $h'$ passing through a slot $h^2$ in the scraper and a slotted bracket $h^3$ on the frame, so that the position of the scrapers or brushes in relation to the buffers may be adjusted as desired from time to time. To direct the particles of solder removed from the outside surface of the can by the buffers into a pan or receptacle K, I arrange solder guide-plates K' K' below the buffers G' G' and a curved hood or shield $K^2$ above the upper buffers G G and curved shields $K^3$ $K^3$, one extending over each of the lower buffers G', as will be readily understood from the drawings.

M M' are a pair of cooling-belts, one at each side of the machine, traveling over horizontal pulleys $m$ $m$ for conveying the cans in an upright position with the ends thereof which have just been soldered and buffed lowermost, so that the cans may be held and conveyed in an upright position with their freshly-soldered circumferential seams horizontal while the solder is cooling and setting in order that all danger of defective seams from the solder in the joint running and collecting more at one point than another may be prevented. To facilitate the cooling of the freshly soldered and buffed seams, cool air may be projected against the cans as they are conveyed along the cooler-belt from the cold-air trunks N. Each of the cooling-belts M M' preferably consist of a pair of metal chains $m'$ $m'$, connected together by cross slats or plates of metal $m^2$.

P P are curved and twisted guideways extending from the rear ends of the can runways or tracks B B' to the cooling-belts M M' below and by which the cans are automatically turned from the inclined position in which they are rolled along the runways B B' into an upright position and delivered in such upright position onto the cooling-belts.

R is the driving-shaft. Motion is preferably communicated therefrom to the pulley-shaft $f^{15}$ of the endless conveyers F F through a pulley $r$ on the driving-shaft R, belt $r'$, pulley $r^2$ on shaft $r^3$ and gears $r^4$ $r^5$. Motion is preferably communicated from the driving-shaft R to the pulley-shaft $f^{16}$ of the endless conveyers F" F" through a pulley $r^6$ on the driving-shaft R, belt $r^7$, and pulley $f^7$ on said pulley-shaft $f^6$. Motion is preferably communicated from the driving-shaft R to the pulley-shaft $m^3$ of the cooling-belts M M' by a pulley $r^8$ on the driving-shaft R, belt $r^9$, and pulley $m^4$ on a pulley-shaft $m^5$ and gears $m^6$ $m^7$, the gear $m^6$ being on the pulley-shaft $m^3$ of the cooling-belts.

The soft flexible composite cloth disk buffers G G' G G' are preferably all geared together to rotate in the required direction by a sprocket chain or belt $G^2$, passing over or around a pulley $G^3$ on the shaft of each of the buffers and over or around a pulley $G^4$ on the buffer-driving shaft $G^5$ and over or around the idle pulleys $G^6$ $G^7$ and the belt-tightener pulley $G^8$, and the soft flexible composite disk buffers G G' are all rotated at the requisite speed, preferably about six hundred revolutions per minute, to cause the soft flexible composite cloth circular disk buffers to effectually remove the surplus solder from the outside surface of the can adjacent to the seam without injuring the seam or without scratching or marring the tin coating of the tin plate and to buff and polish the outside surface of the can, which has been immersed in or come in contact with the molten solder of the solder-bath, preferably through a pulley $r^{10}$ on the driving-shaft R, belt $r^{11}$, center shaft T, having small pulley $t$ for said belt $r^{11}$, large pulley $t'$ on said shaft T, belt $t^2$, and small pulley $t^3$ on the buffer-driving shaft $G^5$. It will, however, be understood by those skilled in the art that motion may be communicated to the several moving devices of the machine by any suitable driving mechanism. I, however, prefer to use that above described, and illustrated in the drawings.

S is a curved chute or runway of a loop form and furnished with an endless belt or chain elevator S', which looped runway and elevator operate to take the cans after one end thereof has been soldered from one cooling-belt, raise them to the level of the other track or runway B', and turn the cans end for end preparatory to soldering the other or remaining end of the can.

In operation the cans roll from the chute E or E' onto the transversely-inclined runway B, along which they are rolled by the chain conveyer F over the flux-bath and then over the solder-bath, and then while the solder is in a molten condition on the cans the cans come in contact with the rapidly-revolving buffers G G', which operate by a buffing action to remove the surplus solder from the outside surface of the can which has been immersed in the solder and to polish such surface and restore it to its original bright tin luster. The length of the rapidly-revolving cylindrical buffers G G' is such, in connection with the speed with which the cans are rolled along the track B by the endless conveyer F', that the cans are conveyed past the buffers and delivered in an upright position onto the cooling-belt before the solder in the seam cools or sets, and then the cans are conveyed by the cooling-belt in an upright position for a time sufficient to allow the solder in the seam to become thoroughly set, so that the solder in the seam cannot run to or collect at one point more than another. The cans as they pass off the cooling-belt over and around the cooling-belt pulley are delivered into the loop-runway S, which delivers them to the endless belt or chain elevator S', by which they are raised again above the level of the runway or track B'. The cans then continue to roll along the loop-runway S and are delivered to the runway B' on the opposite side of the machine, the loop-runway serving to turn the cans end for end, so that the unsoldered end thereof is now lowermost on the track B'. The cans are now rolled along the other track B', over the flux-bath and solder-bath, and past the other pair of buffers G G', after which they are delivered in an upright position onto the cooling-belt and from which the cans are delivered from the machine with both ends soldered and the surplus solder removed from both ends and both ends buffed and polished.

I claim—

1. In an end-soldering machine for sheet-metal cans, the combination with a flux-bath, a solder-bath, two transversely-inclined runways for the cans, two pairs of rapidly-revolving soft cylindrical buffers, composed of flexible, textile disks, and arranged parallel to said runways, two endless-chain conveyers for rolling the cans along the flux and solder bath portion of said runways, two endless-belt conveyers for rolling the cans along the portion of the runways adjacent to said buffers, two cooling-belts for conveying the freshly-soldered and buffed cans in an upright position while the solder in the can-seams is cooling or setting, two devices for turning and delivering the cans from the runways onto the cooling-belts in an upright position, and a loop-track furnished with an elevator for elevating and turning the cans end for end after the end seams at one end of the cans have been soldered and delivering the same to the other runway for soldering the other end thereof, substantially as specified.

2. In a can-end-soldering machine, the combination with a can-runway, solder-bath, cooling-belt, and means for rolling the cans along the runway, of a pair of rapidly-rotating soft, cylindrical buffers composed of flexible circular textile disks, arranged longitudinally adjacent to the runway and engaging the fresh solder-coated outside surface of the cans as they are rolled along the runway to remove the surplus solder from such surface and polish or buff the same before the cans are delivered to the cooling-belt, substantially as specified.

3. In a can-end-soldering machine, the combination with the solder-bath, can-runway, and means for rolling the cans along the runway, of a pair of rapidly-rotating soft flexible cylindrical buffers engaging the outside solder-coated surfaces of the cans as they roll along the runway, and a cooling-belt, substantially as specified.

4. In a can-end-soldering machine, the combination with two transversely-inclined can-runways, of a solder-bath, means for rolling the cans along the runways, two pairs of rapidly-rotating, soft, flexible buffers, each composed of a series of thin circular textile disks, and two cooling-belts, substantially as specified.

5. In a can-end-soldering machine, the combination with two transversely-inclined can-runways, of a solder-bath, means for rolling the cans along the runways, two pairs of rapidly-rotating, soft, flexible buffers, each composed of a series of thin circular textile disks, two cooling-belts, and means for delivering the cans from the runways to the cooling-belts in an upright position, substantially as specified.

6. In a can-end-soldering machine, the combination with two transversely-inclined can-runways, of a solder-bath, means for rolling the cans along the runways, two pairs of rapidly-rotating, soft, flexible buffers, each composed of a series of thin circular textile disks, two cooling-belts, means for delivering the cans from the runways to the cooling-belts in an upright position, and a loop-track and elevator for delivering the cans from the cooling-belt on one side of the machine to the runway on the other side of the machine, substantially as specified.

7. The combination with a can-track, of a solder-bath, a conveyer for the cans, a rapidly-rotating soft cylindrical buffer, a scraper for removing particles of solder from the buffer, and a shield or hood over the buffer, substantially as specified.

8. The combination with a can-track, of a solder-bath, a conveyer for the cans, a rapidly-rotating soft cylindrical buffer, a scraper for removing particles of solder from the buffer, a shield or hood over the buffer, and a solder guiding or deflecting plate, substantially as specified.

9. In a can-end-soldering machine, the combination with a can-runway and a solder-bath, of rapidly-rotating soft, cylindrical buffers composed of flexible, textile disks, an endless conveyer for rolling the cans along the track over the solder-bath, and a second endless conveyer for rolling the cans along the track adjacent to the buffer, substantially as specified.

10. In a can-end-soldering machine, the combination with a can-runway, of a solder-bath, a longitudinally-arranged rotating buffer parallel to the runway, an endless belt for rolling cans along the runway in engagement with the buffer, a tension-bar bearing against the belt to increase its grip on the cans, guides for said tension-bar, and said tension-bar having a pivotal connection with said guides, substantially as specified.

11. The combination with a transversely-inclined can-runway, of a belt traveling on horizontal pulleys for rolling the cans along the runway, a transversely-inclined tension-bar resting on the belt, guides for said transverse bar, and a pivotal connection between said guides and said tension-bar, substantially as specified.

12. In a can-end-soldering machine, the combination with a can-runway, of a solder-bath, a rotating buffer parallel to said runway and engaging the solder-coated outside surface of the cans before the solder thereon sets or hardens, and a cooling-belt for holding and conveying the cans in an upright position while the solder sets, substantially as specified.

13. In a can-end-soldering machine, the combination with a can-runway, of a solder-bath, a rotating buffer parallel to said runway and engaging the solder-coated outside surface of the can before the solder sets or hardens, a cooling-belt for holding and conveying the cans in an upright position while the solder sets, and means for turning the cans from their inclined position to an upright position and delivering them onto the cooling-belt, substantially as specified.

14. In a can-end-soldering machine, the combination with a can-runway, of a solder-bath, a rotating buffer parallel to said runway and engaging the solder-coated outside surface of the cans before the solder thereon sets or hardens, a cooling-belt for holding and conveying the cans in an upright position while the solder sets, and a curved and twisted guide for turning the cans from the inclined position of the runway to an upright position and delivering them to the cooling-belt, substantially as specified.

15. In a can-end-soldering machine, the combination with a solder-bath, of two transversely-inclined can-runways, one on each side of the machine, two cooling-belts below the runways, means for rolling the cans along the runways, and two pairs of rapidly-rotating soft, cylindrical buffers composed of flexible textile disks parallel to the runways, substantially as specified.

16. In a can-end-soldering machine, the combination with a solder-bath, of two transversely-inclined can-runways, one on each side of the machine, two cooling-belts below the runways, means for rolling the cans along the runways, two pairs of rapidly-rotating soft, cylindrical buffers composed of flexible textile disks parallel to the runways, and means for turning the cans into an upright position and delivering them to the cooling-belts as they leave the runways, substantially as specified.

17. In a can-end-soldering machine, the combination with a solder-bath, of two transversely-inclined can-runways, one on each side of the machine, two cooling-belts below the runways, means for rolling the cans along the runways, two pairs of rapidly-rotating soft, cylindrical buffers composed of flexible textile disks parallel to the runways, means for turning the cans into an upright position and delivering them to the cooling-belts as they leave the runways, and a loop-runway and elevator for turning the cans end for end and delivering them from the cooling-belt on one side of the machine to the runway on the other, substantially as specified.

18. In a can-end-soldering machine, the combination with a solder-bath, of two transversely-inclined can-runways, one on each side of the machine, two cooling-belts below the runways, means for rolling the cans along the runways, two pairs of rapidly-rotating soft, cylindrical buffers composed of flexible textile disks parallel to the runways, and scrapers for said buffers, substantially as specified.

19. In a can-end-soldering machine, the combination with a solder-bath, of two transversely-inclined can-runways, one on each side of the machine, two cooling-belts below the runways, means for rolling the cans along the runways, two pairs of rapidly-rotating soft, cylindrical buffers composed of flexible textile disks parallel to the runways, scrapers for said buffers, and a hood covering the two upper buffers, curved shields over the two lower buffers and solder guiding or deflecting plates below the buffers, substantially as specified.

20. In a can-end-soldering machine, the combination with a can-runway, of means for rolling the cans along the runway, means for applying molten solder to the end seams of the cans as they roll along the runway, a rotating cylindrical buffer parallel to the can-runway and engaging the solder-coated outside surface of the cans before the solder thereon sets or hardens, and a can-cooling conveyer for holding and conveying the cans in an upright position while the solder sets after being acted upon by said buffer, substantially as specified.

21. In a can-end-soldering machine, the combination with a can-runway, of means for rolling the cans along the runway, means for applying molten solder to the end seams of the cans as they roll along the runway, a rotating cylindrical buffer parallel to the can-runway and engaging the solder-coated outside surface of the cans before the solder thereon sets or hardens, and a can-cooling conveyer for holding and conveying the cans in an upright position while the solder sets after being acted upon by said buffer, and means for turning the cans from their rolling position on said runway and delivering them onto said cooling-conveyer in an upright position, substantially as specified.

22. In a can-end-soldering machine, the combination with a solder-bath, of a can-runway, means for rolling the cans along the runway, a can-cooling conveyer for conveying the freshly-soldered cans in an upright position while the solder in the can-seams is setting or cooling, and a long, cylindrical buffer parallel to the can-runway and interposed along the path of the cans between the solder-bath and said can-cooling conveyer, substantially as specified.

23. In a can-end-soldering machine, the combination with a can-runway, of an endless moving conveyer for rolling the cans along the runway, a solder-bath, and a pair of rapidly-rotating soft, cylindrical buffers composed of a series of thin, flexible circular, textile disks, said buffers having their axes parallel to said runway, and one engaging the outside solder-coated cylindrical surface of the can-head flange and can-body, and the other engaging the solder-coated flat or disk surface of the can-head as the cans are rolled along said runway and means for rotating said buffers at a high speed, substantially as specified.

24. In a can-end-soldering machine, the combination with a can-runway, a movable device engaging the cans on the runway for rolling the same thereon, a solder-bath, and a pair of rapidly-rotating, long, soft, cylindrical buffers parallel to said runway, composed each of a series of thin, flexible, textile disks with interposed washers of less diameter than the disks, one of said buffers engaging the outside solder-coated cylindrical surface of the can-head flange and can-body, and the other engaging the flat or disk solder-coated surface of the can-head and means for rotating said buffers at a high speed, substantially as specified.

25. In a can-end-soldering machine, the combination with a solder-bath, of a can-runway, a moving device for rolling the cans along the runway, and a rapidly-rotating, long, soft cylindrical buffer parallel to said runway, composed of a series of thin, flexible, textile disks, and engaging the outside solder-coated surfaces of the cans as they roll along the runway and means for rotating said buffers at a high speed, substantially as specified.

26. In a can-end-soldering machine, the combination with a solder-bath, of a can-runway, a moving device for rolling the cans along the runway, and a rapidly-rotating, long, soft, cylindrical buffer, parallel to said runway, composed of a series of thin, flexible, textile disks and interposed washers of less diameter than the disks, and engaging the outside solder-coated surface of the cans as they roll along the runway and means for rotating said buffers at a high speed, substantially as specified.

27. In a can-soldering machine, the combination with a can-soldering means, of a rapidly-rotating, long, soft, cylindrical buffer, composed of a series of thin, flexible, textile disks for removing the solder from the outside surface of the cans and polishing the same, a runway for the cans parallel to said long, cylindrical buffer, and an endless conveyer engaging the cans on the runway for rolling the same thereon in engagement with said buffer and means for rotating said buffers at a high speed, substantially as specified.

28. In a can-end-soldering machine, the combination with a soldering mechanism, of a long, soft, cylindrical buffer, composed of a series of thin, flexible, textile disks and interposed washers of less diameter than the disks, a runway for the cans parallel to said long, cylindrical buffer, and an endless moving conveyer engaging the cans on the runway for rolling the cans along the runway in engagement with the buffer and means for rotating said buffers at a high speed, substantially as specified.

JOHN C. TALIAFERRO.

Witnesses:
 RICHARD GWINN,
 CHAS. REYNARD.